June 21, 1932.  R. W. SIEFFERT  1,864,377
RIVET
Filed Dec. 4, 1929

Ralph W. Sieffert
INVENTOR
BY Victor J. Evans
ATTORNEY

Patented June 21, 1932

1,864,377

UNITED STATES PATENT OFFICE

RALPH W. SIEFFERT, OF ALIQUIPPA, PENNSYLVANIA

RIVET

Application filed December 4, 1929. Serial No. 411,555.

This invention relates to rivets and has for an object the provision of a rivet which may be used as a substitution for the hot rivet now generally employed, and will require the services of only a single workman for applying the same.

Another object of the invention is the provision of a "one man rivet" which is adapted to be driven into position, and which will expand during the driving operation, the construction of the rivet and its action during driving, being such that the rivet will not only be securely held in place, but will be air and water tight.

With the above and other objects in view, the invention further includes the following novel features and details of construction, to be hereinafter more fully described, illustrated in the accompanying drawing and pointed out in the appended claim.

In the drawing:—

Figure 1:
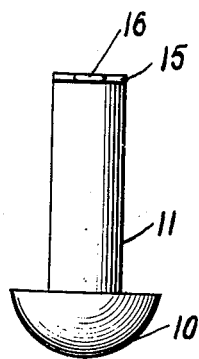
Figure 1 is an elevation of a rivet constructed in accordance with the invention.
Figure 2:
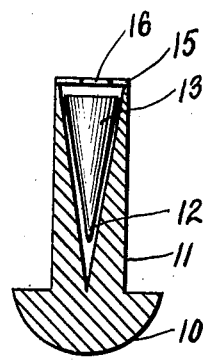
Figure 2 is a longitudinal sectional view thereof.
Figure 3:
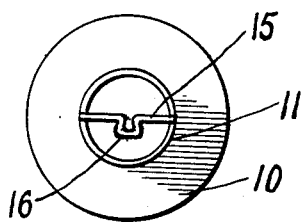
Figure 3 is an end view.

Referring to the drawing in detail wherein like characters of reference denote corresponding parts, the reference character 10 indicates the head of the rivet which is located at one end of the shank 11. This shank is provided with a bore 12 whose walls taper inwardly from the outer end of the shank to the head so as to provide an elongated conical recess for the reception of a movable expansion element 13.

The element 13 is also conical, the taper of the periphery of the expansion element conforming to the taper of the inner end of the recess core 12 when the shank is expanded.

Figure 5:
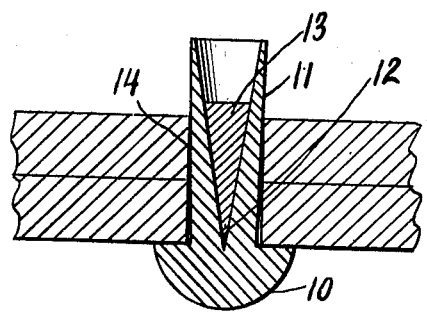
Figure 5 is a sectional view illustrating the use of the rivet.

Normally, the expansion element 13 is positioned within the outer end of the shank 11 and when the rivet is driven into position, the action of the riveting hammer upon the head 10 will force the expansion element 13 inward so as to cause the rivet to tightly grip the edges of an opening 14, as shown in Figure 5 of the drawing. In this figure the parts are exaggerated to more clearly illustrate the invention.

In order to retain the expansion element within the bore prior to the riveting operation, the outer end of the recess or bore 12 is bridged by a wire 15. The opposite ends of this wire are welded or otherwise suitably secured to the rivet and the intermediate portion of the wire is provided with a loop 16 which will expand with the expansion of the rivet.

Figure 4:
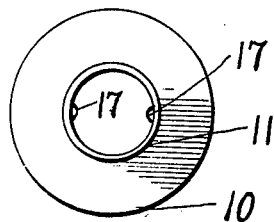
Figure 4 is a similar view showing a slightly different form of the invention.

If desired, the inner end of the rivet may be peened over the expansion element 13 as shown at 17 in Figure 4 of the drawing. This method of retaining the expansion element may be substituted for the wires shown in the other figures of the drawing.

The invention is susceptible of various changes in its form, proportions and minor details of construction and the right is herein reserved to make such changes as properly fall within the scope of the appended claim.

Having described the invention what is claimed is:—

In a rivet, a head, a shank extending from said head and having a bore tapered from the outer end of said shank inward, a conical shaped expansion element housed and mounted for slidable movement within the bore for fitting engagement therewith and being adapted to expand the shank upon inward movement of the element, and a wire looped midway its ends and bridging the outer end of the bore to retain said element therein.

In testimony whereof I affix my signature.

RALPH W. SIEFFERT.